Feb. 21, 1933.    O. KÖHLER    1,898,190
CLUTCH MECHANISM
Filed Aug. 26, 1930

Inventor
Otto Köhler
By Marks & Clerk
Attys.

Patented Feb. 21, 1933

1,898,190

UNITED STATES PATENT OFFICE

OTTO KÖHLER, OF STUTTGART-UNTERTURKHEIM, GERMANY, ASSIGNOR TO DAIMLER-BENZ AKTIENGESELLSCHAFT, OF STUTTGART-UNTERTURKHEIM, GERMANY, A COMPANY OF GERMANY

CLUTCH MECHANISM

Application filed August 26, 1930, Serial No. 477,917, and in Germany May 3, 1929.

In the designing of motor vehicles means and ways are always being sought for overcoming the unpleasant noise when changing gears.

This invention relates to clutches for the noiseless changing of gear ratios. The clutches are engaged by spring pressure and are disengaged by positive means, the clutches of two adjacent speeds being connected by a member which allows of a limited motion of the two clutches with respect to one another. The connecting member is engaged by the gear fork. Simultaneously with the positive disengagement of one clutch the spring for engaging the other clutch is stressed.

Figure 1:
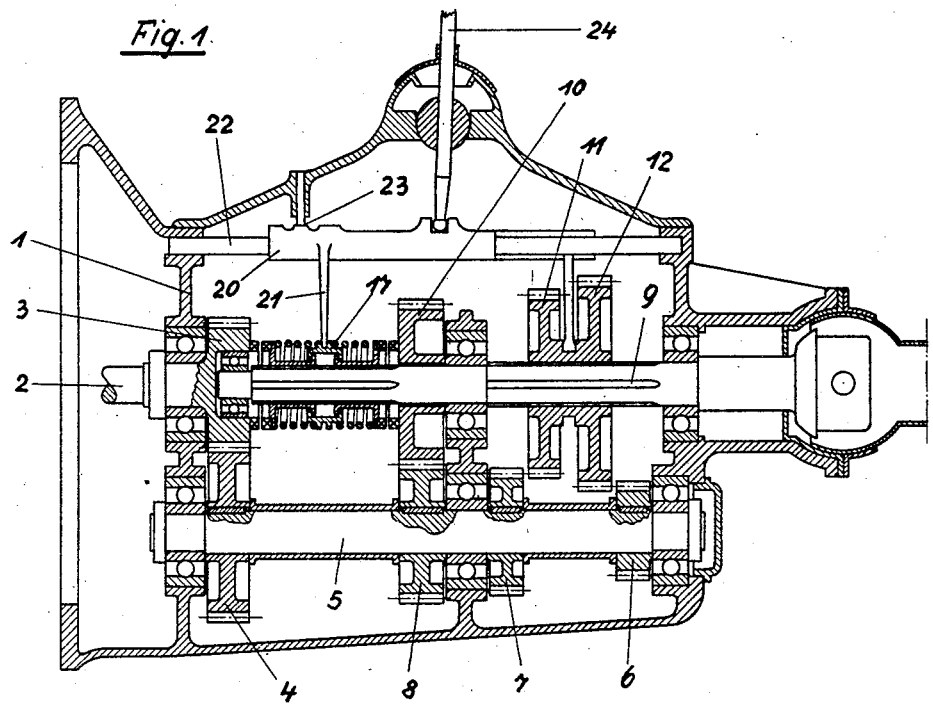
Figure 2:
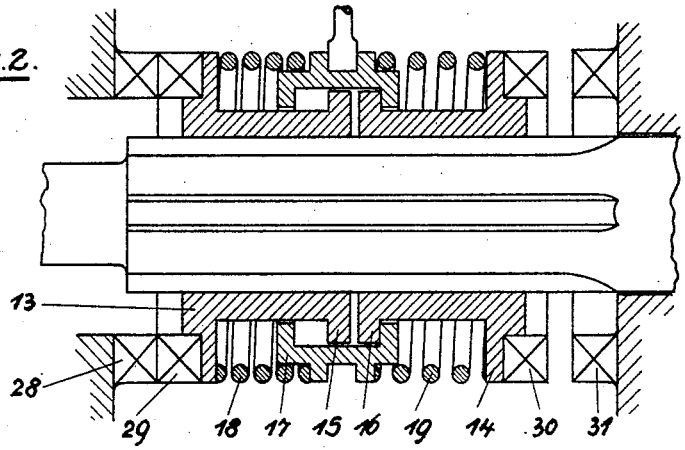
Figures 3, 4:
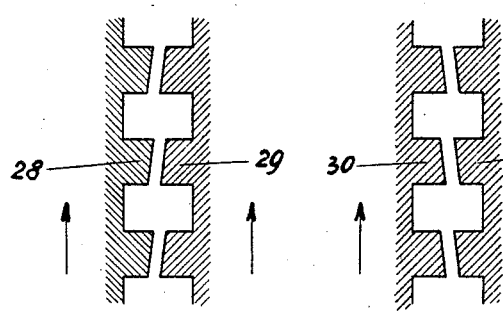

In the accompanying drawing a mechanism according to the invention is illustrated in four figures, of which Figure 1 is a longitudinal section through the mechanism, Fig. 2 a longitudinal section through two clutches to an enlarged scale and Figures 3 and 4 show the inclined end surfaces of the teeth of the clutch members, which allow one part of the clutch to overtake the other.

In the drawing a 4-speed change-speed gear is shown. In the gear box 1 is journalled the driving shaft 2 which is connected to the engine coupling and on which the toothed wheel 3 is fixed. This toothed wheel meshes with the toothed wheel 4 which is keyed on the lay shaft 5. On this shaft are also keyed the toothed wheels 6, 7, 8 of the I, II and III speed. The main shaft 9 is journalled at one end in the casing and at the other end in the toothed wheel 3 and on it is mounted loosely the wheel 10 and the wheels 11 and 12 slidable on keys. On the wheels 3 and 10 are clutch lugs with which the clutch members 13 and 14 which slide on keys on the shaft 9 can be brought into engagement. The clutch lugs on the toothed wheels 3 and 10 and on the clutch members 13 and 14 have inclined faces, as shown in Figs. 3 and 4, for enabling the more slowly running part to be overtaken by the more rapidly running part. The clutch members 13 and 14 terminate at their ends facing one another in flanges 15 and 16 over which the sleeve 17 engages, which connects the two clutch members. Between the clutch members and the sleeve the compression springs 18 and 19 are interposed. The sleeve 17 is engaged by the clutch fork 21 on the selector bar 20. The selector bar 20 which is in the form of a sleeve slides on the shaft 22 and is held in the different positions by the catch mechanism 23. The gear lever 24 engages in the selector bar in a known manner.

The gear operates as follows:

With the 1st speed the driving power is transmitted from the driving shaft 2 over the wheels 3 and 4 to the lay shaft 5 and over the wheels 6 and 12 to the main shaft 9. With the 2nd speed instead of wheels 6 and 12 wheels 7 and 11 are brought into operation. The changing of these speeds is effected in a known manner with the engine clutch disengaged. With the third speed the main shaft 9 is driven from the lay shaft 5 over the wheels 8 and 10. With the 4th speed the shafts 2 and 9 are directly coupled. For changing from the 2nd to the 3rd speed the engine is first throttled and the clutch then disengaged. In consequence of this the speed of the shaft 2 decreases considerably, while the shaft 9 with the clutch members 14 and 13 for the time being still retains the speed of revolution corresponding to the speed of travel. Immediately after the clutch has been disengaged the gear lever 24 is brought into engagement with the selector bar 20 and is moved to the right, stressing the spring 19. This spring forces the clutch lugs 30 against the lugs 31 which, as shown in Fig. 4, are so inclined that at first the clutch member 14 can overtake the lugs 31. The vehicle clutch is then at once re-engaged, causing the speed of revolution of the shaft 5 and consequently of the clutch lugs 31 to increase and enabling the clutch lugs 30 to be engaged in the clutch lugs 31.

On changing from the 3rd to the 4th speed, the fuel is also cut off and the engine disconnected. At the same time the gear lever 24 is moved to the left, which through the sleeve 17 positively disengages the clutch member 14. Through this motion to the left the spring 18 is stressed, which forces the lugs 29 of the clutch member 13 against the clutch lugs 28 on the wheel 3. As, however, the speed of the clutch member 13 is greater than that of the clutch lugs 28 the former must be able to overtake the latter. The lugs are therefore provided for instance with an inclined surface as shown in Fig. 3. Through the re-engagement of the engine clutch the speed of the clutch lugs 28 is increased and through the unstressing of the spring 18 the clutch lugs 29 are caused to engage in the clutch lugs 28.

Means for changing from the 3rd to the 4th speed in accordance with the invention can of course also be used in connection with speeds I and II. A change speed gear can also be formed from a number of single speeds with interposed controlling means in accordance with the invention. The overtaking clutch members can also be operated with disengaging the engine simply by throttling the same.

What I claim is:

1. In a change speed gear for power driven vehicles the combination, with a driven shaft, a driving member freely rotatable relatively to said driven shaft and coupling means comprising a coupling member movable from an operative position in driving engagement with said driven shaft and driving member into an inoperative position out of driving engagement with said driving member, said coupling member having a pair of abutments spaced apart lengthwise of the coupling member, of an annular operating member slidable on the coupling member between said abutments and adapted to engage positively the abutment remote from the driving member, and resilient connecting means interposed between the annular operating member and the abutment adjacent the driving member, so that the disengagement of the coupling member is effected positively by the said annular actuating member and the engagement through the intermediary of the said resilient member.

2. In a change speed gear for power driven vehicles the combination with a driven shaft and two driving members freely rotatable relatively to said shaft, of two coupling members each movable respectively from an operative position in driving engagement with the shaft and one of said driving members, for coupling the one or the other of the said driving members to the said shaft, into an inoperative position in driving engagement with only one of said elements, each of said coupling members having a pair of abutments spaced apart lengthwise of the coupling member, an actuating member having stops thereon and located with the stops extending between the abutments of the respective coupling members, and springs for pressing the stops of the actuating member against the abutments of the coupling members remote from the respective driving members, said springs interposed between said stops and the abutments adjacent the respective driving members, so that the disengagement of the coupling members is effected positively by the said stops and the engagement against the force of the said springs.

3. In a change speed gear for power driven vehicles, the combination with a driven shaft and two gear wheels freely rotatable relatively to said shaft, of two coupling members non-rotatable but slidable on said shaft between said gear wheels with the adjacent ends of the coupling members spaced apart, abutments on said coupling members on the ends thereof adjacent one another, a displaceable operating sleeve located between said gear wheels and so as to extend over said abutments, said sleeve having stops thereon extending over said abutments so as to be engageable positively therewith, claw teeth on said coupling members on the ends thereof remote from said abutments, claw teeth on said gear wheels engageable with the claw teeth on the respective coupling members, so that on the coupling members being moved along the shaft in one direction, the claw teeth of one coupling member will engage the claw teeth of the one gear wheel and on being moved in the opposite direction the claw teeth of the other coupling member will come into engagement with the claw teeth of the other gear wheel, abutments on the ends of the coupling members adjacent the gear wheels, springs arranged between said abutments and the stops on the said sleeve for forcing the coupling members apart with the first-mentioned abutments in engagement with the stops on the sleeve, and actuating means operatively connected to said sleeve for displacing the sleeve in either direction whereby the coupling members can be approached to one another against the force of the springs within the limits of the spacing between the adjacent ends of the coupling members.

In testimony whereof I affix my signature.

OTTO KÖHLER.